(12) United States Patent
Beskales et al.

(10) Patent No.: US 9,720,986 B2
(45) Date of Patent: Aug. 1, 2017

(54) METHOD AND SYSTEM FOR INTEGRATING DATA INTO A DATABASE

(71) Applicant: QATAR FOUNDATION, Doha (QA)

(72) Inventors: George Beskales, Doha (QA); Ihab Francis Ilyas Kaldas, Waterloo (CA)

(73) Assignee: QATAR FOUNDATION, Doha (QA)

(*) Notice: Subject to any disclaimer, the term of this patent is extended or adjusted under 35 U.S.C. 154(b) by 487 days.

(21) Appl. No.: 13/928,983

(22) Filed: Jun. 27, 2013

(65) Prior Publication Data
US 2014/0156606 A1 Jun. 5, 2014

(30) Foreign Application Priority Data

Jul. 16, 2012 (WO) ............... PCT/EP2012/063930

(51) Int. Cl.
*G06F 17/30* (2006.01)

(52) U.S. Cl.
CPC .. *G06F 17/30557* (2013.01); *G06F 17/30303* (2013.01)

(58) Field of Classification Search
CPC ................................. G06F 17/30489
USPC .................................. 707/692, 664
See application file for complete search history.

(56) References Cited

U.S. PATENT DOCUMENTS

| | | | |
|---|---|---|---|
| 7,702,631 B1* | 4/2010 | Basu ............... | G06F 17/30489 707/999.006 |
| 2004/0010497 A1* | 1/2004 | Bradley ........... | G06F 17/30705 707/707 |
| 2004/0107205 A1* | 6/2004 | Burdick ........... | G06F 17/30303 707/707 |
| 2006/0004595 A1* | 1/2006 | Rowland ........... | G06Q 10/06 705/1.1 |

(Continued)

OTHER PUBLICATIONS

Nadkarni P.M., et al., "Data extraction and ad hoc query of an entity-attribute-value database," Jnl of American Medical Informatics Association (Jamia), vol. 5, No. 6, pp. 511-527 (Nov. 1, 1998).

(Continued)

*Primary Examiner* — Robert Beausoliel, Jr.
*Assistant Examiner* — Alexandria Bromell
(74) *Attorney, Agent, or Firm* — Mossman, Kumar & Tyler, PC

(57) ABSTRACT

A method for integrating data into a database comprises storing data comprising a plurality of records which each comprise a plurality of attributes; analyzing a sample of records from the plurality of records by: identifying duplicate pairs of records in the sample records; analyzing each attribute of each record of the duplicate pairs of records to identify a respective attribute condition which is indicative that the pairs of records are duplicates; wherein the method further comprises: comparing each attribute of a record with the respective attribute condition and, if the attribute satisfies the attribute condition, allocating the record to a disjoint group which comprises records with an attribute that satisfies the same respective attribute condition; identifying duplicate pairs of records in the records in each disjoint group; identifying duplicate pairs of records in records that are not allocated to a disjoint group; and consolidating each duplicate pair of records into one consolidated record and storing the consolidated record in an integrated database.

14 Claims, 2 Drawing Sheets

(56) References Cited

U.S. PATENT DOCUMENTS

| | | | | |
|---|---|---|---|---|
| 2009/0234826 A1* | 9/2009 | Bidlack | ............ | G06F 17/30489 707/707 |
| 2010/0280984 A1* | 11/2010 | Gengembre | ...... | G06F 17/30247 706/52 |
| 2011/0004622 A1* | 1/2011 | Marson | ................. | G06Q 10/06 707/770 |
| 2012/0130736 A1* | 5/2012 | Dunston | ................ | G06Q 50/22 705/2 |
| 2012/0158678 A1* | 6/2012 | McGraw | .......... | G06F 17/30303 707/694 |
| 2012/0278263 A1* | 11/2012 | Borthwick | ........ | G06F 17/30303 706/12 |

OTHER PUBLICATIONS

Xing, Liu, "Mineralization Information Mining from GIS Map & Attribution Database and Multi-sources Data Intergration," Database Technology and Applications, 2009 1st Int'l Workshop on, IEEE, Piscataway, NJ, pp. 217-220, (Apr. 25, 2009).

Int'l Search Report in PCT/EP2012/063930, dated Nov. 2, 2012.

* cited by examiner

METHOD AND SYSTEM FOR INTEGRATING DATA INTO A DATABASE

CROSS-REFERENCE TO RELATED APPLICATION

This application claims foreign priority from International Patent Application No. PCT/EP2012/063930, filed Jul. 16, 2012, which application is incorporated by reference herein in its entirety.

BACKGROUND OF THE DISCLOSURE

1. Field of the Disclosure

The present disclosure relates to a method and system for integrating data into a database and more particularly relates to a method and system for integrating data from multiple data sources into a database whilst minimising data duplication.

2. Background of the Disclosure

The volume of data stored in databases is growing exponentially, as is the rate at which the data becomes available. The data which is to be stored in databases is also becoming more complex since each record often comprises a large number of different attributes.

Data from multiple data sources often needs to be integrated into a central database. With large volumes of data, integration into a central database can result in the data in the central database being plagued with errors and anomalies, such as duplicate records. Duplicate records are database records that refer to the same real-world entity. Duplicate records have a negative impact on the effectiveness of data querying and analysis tasks. The result is poor data analysis efficiency and a higher cost to enterprises using the data.

It has been proposed previously to use de-duplication rules to de-duplicate data. The de-duplication rules are learnt from training data which is either passively collected before the learning process or actively collected during the learning process. Conventional methods which use such de-duplication rules are, however, limited and are not able to handle heterogeneous data representing different types of entities due to the diverse characteristics of each entity type.

A distributed duplicate elimination method has been proposed previously which parallelises the de-duplication process using the MapReduce model. However, the problem with this method is that it is incapable of operating on records which have a sparseness of data, a large number of attributes or heterogeneous attributes/entity types.

A further technique has been proposed previously in which duplicate detection is carried out using structured query language (SQL) queries that are processed using a database management system (DBMS). The problem with this technique is that it must rely on an index to record and retrieve similar records. Building and updating such an index is prohibitively slow for large data sets with thousands of attributes.

Techniques have been proposed previously in which records are partitioned into blocks that are either disjoint or overlapping. These techniques rely on either sorting or indexing the records, which are both expensive operations with a large time complexity with respect to the number of records.

There is a need for a method and system for integrating data from multiple data sources into a central database whilst minimising duplication of records in the central database.

The present disclosure seeks to provide an improved method and system for integrating data into a database.

SUMMARY OF THE DISCLOSURE

According to one aspect of the present disclosure, there is provided a method for integrating data into a database, the method comprising: storing data comprising a plurality of records which each comprise a plurality of attributes; analysing a sample of records from the plurality of records by: identifying duplicate pairs of records in the sample records; analysing each attribute of each record of the duplicate pairs of records to identify a respective attribute condition which is indicative that the pairs of records are duplicates; wherein the method further comprises: comparing each attribute of a record with the respective attribute condition and, if the attribute satisfies the attribute condition, allocating the record to a disjoint group which comprises records with an attribute that satisfies the same respective attribute condition; identifying duplicate pairs of records in the records in each disjoint group; identifying duplicate pairs of records in records that are not allocated to a disjoint group; and consolidating each duplicate pair of records into one consolidated record and storing the consolidated record in an integrated database.

Preferably, records are allocated to each disjoint group in linear time.

Conveniently, the method further comprises truncating predetermined words which are insignificant for deduplication from attributes of records.

Advantageously, the method further comprises identifying distinctive features of records.

Preferably, in the method comprises allocating each record which comprises a distinctive feature to a respective disjoint group which comprises records with the same distinctive feature.

Conveniently, the method comprises only allocating a record to a disjoint group if, after a predetermined time, there are more than a predetermined number of records in the disjoint group.

Advantageously, identifying duplicate pairs of records comprises: analysing the attributes of the records; identifying candidate pairs of records, each candidate pair comprising a two records which have at least one similar attribute; generating a similarity value which is indicative of the level of similarity between the two records in each candidate pair; identifying each candidate pair with a similarity value above a predetermined level as a duplicate pair of records.

Preferably, before the step of analysing the attributes of the records, the method further comprises learning at least one rule using sample data and then subsequently using each rule in the method to identify the candidate pairs of records and generate the similarity value.

Conveniently, the sample data comprises only duplicate records.

Advantageously, the method comprises grouping the records in the sample data into groups of records with records in each group having at least one attribute which is the same as at least one attribute in another record in the group.

Preferably, the similarity value is a conditional probability value which is indicative of the probability of the two records in a candidate pair being duplicates of one another.

Conveniently, the step of learning each rule comprises calculating the probability distribution by comparing the attributes of known duplicate records with a random sample of pairs of records.

Advantageously, the calculation is based on the Bayes' rule.

Preferably, the method further comprises calculating the conditional probability value from the probability distributions using the Naïve Bayes' rule.

Conveniently, the method further comprises comparing the similarity value of each candidate pair with the similarity value of each other candidate pair and clustering the records into a set of disjoint clusters.

Advantageously, the method comprises storing information representing each cluster for use with further data.

Preferably, the method comprises using a plurality of rules to identify duplicate records.

Conveniently, the steps of the method are repeated for a plurality of data sources, one data source at a time.

According to another aspect of the present disclosure, there is provided a computer readable storage medium storing machine readable instructions that, when executed by a processor, implement any of the above described methods.

BRIEF DESCRIPTION OF THE DRAWINGS

In order that the disclosure may be more readily understood, and so that further features thereof may be appreciated, embodiments of the disclosure will now be described, by way of example, with reference to the accompanying drawings in which.

DETAILED DESCRIPTION

Figure 1:
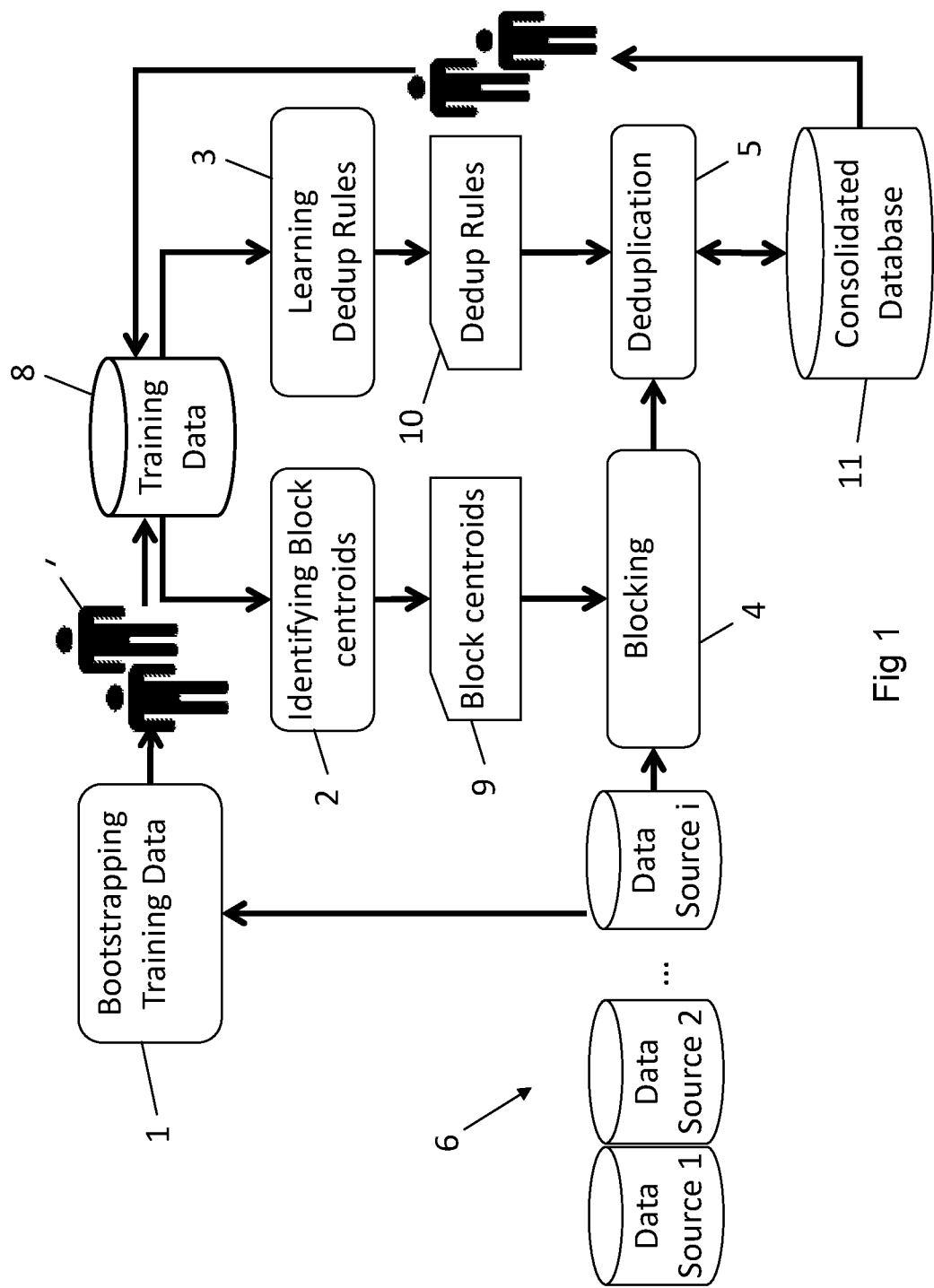
FIG. 1 is a schematic representation of a system for integrating data into a database according to one embodiment of the disclosure.

Referring to FIG. 1 of the accompanying drawings, a system of an embodiment of the disclosure incorporates a bootstrapping module 1, a module for identifying block centroids 2, a rule learning module 3, blocking module 4 and a duplicate elimination module 5.

The bootstrapping module 1 is invoked when the system is started. The bootstrapping module 1 may be invoked on a cold start of the system where no blocking centroids or deduplication rules exist. In one embodiment, the bootstrapping module 1 obtains a sample of records from multiple data sources 6; identifies pairs of records that are most probably duplicates; and transmits them to one or more expert users 7 for verification. In another embodiment, a sample of duplicate records is obtained from other external sources (e.g., legacy deduplication systems). In a further embodiment, sample duplicate records are provided from other external sources in addition to sample records identified by the bootstrapping module 1.

The module for identifying block centroids 2 is operable to obtain a set of distinguishing features to be associated with each block of records, based on training data 8, which is referred to hereafter as block centroid 9. For example, one block centroid 9 could have a feature indicating that "state is similar to California". This embodiment also computes the minimum required similarity, known as the "block radius", between the block centroid 9 and the records to be assigned to this block.

The block centroids 9 are identified as follows. First, the system obtains the necessary conditions that must be satisfied by record pairs to be duplicates. The conditions are based on a sample of duplicates. For example, one necessary condition is that similarity of attribute State must be greater than a certain value x. Then, another sample of records is obtained from the available data sources 6, and the records are clustered such that the minimum distance between records in different clusters is greater than x. Each cluster represents a potential block whose centroid is equal to the most frequent features of the records in the cluster. For example, one centroid is "State=California", and another centroid is "State=Texas". The radius of each block is equal to the minimum similarity between the block centroid 9 and the member records in that block.

After computing the block centroids 9 for each attribute, the system evaluates the expected reduction in the number of record pairs that need to be compared. This is done by blocking a sample of records and counting the number of record pairs that do not have to be considered (i.e., belong to different blocks), and compare the number to the total number of pairs. If the reduction in comparisons is considerable, the attribute is used for blocking. Otherwise, it is discarded.

Blocking the records in a new data source 4 comprises assigning each record to the block whose centroid is most similar to the record. Because each record is checked independently from other records, the time complexity of this blocking method is linear with respect to the number of records.

The training data 8 is processed by the rule learning module 3. The rule learning module 3 is configured to generate rules 10 based on the training data 8. As will become clear from the description below, the rules 10 are used by the duplicate elimination module 5 to eliminate duplicates during a de-duplication stage.

The data sources 6 comprise data records which each comprise a plurality of entity types and attributes. In a preferred embodiment, the data sources 6 comprise duplicate records which are known duplicates of one another. In another embodiment, the data sources 6 comprise records which are not known duplicates of one another. The records of the data sources 6 may comprise null or empty values, such as where attribute values are missing from records.

The rule learning module 3 detects the entity types in the records of the data sources 3. The rule learning module 3 then groups the sample input records into groups based on the entity types in each record. The rule learning module 3 analyses each group of records and generates a set of rules by applying an algorithm to the records to provide a set of rules which indicate the probability of two records being duplicates of one another.

The rule learning module 3 identifies all distinct entity types from the sample of records. Each entity type in the sample preferably has unique characteristics, such as specific attributes or attribute ranges. The rule learning module 3 learns a separate set of de-duplication rules for each entity type from the training data 8 belonging to each entity type.

For each attribute A, the rule learning module 3 learns the conditional probability of a given similarity value of attribute A of two randomly selected records given that the two records are duplicates, denoted $Pr(Sim_A=s|M)$, where s could be a real value or null (indicating that at least one of the records has A=null). The rule learning module 3 also learns the conditional probability $Pr(Sim_A=s|U)$, where U indicates that the two selected records are non-duplicates. The rule learning module 3 learns these probability distributions by comparing the attributes of known duplicates to the attributes of a random sample of pairs. This is preferably done using the Bayes' rule. Using these probability distributions, the rule learning module 3 computes the probability that two records are duplicates given their attribute similarities, denoted $Pr(M|Sim_A, \ldots, Sim_Z)$. This is preferably done using the Naïve Bayes' rule defined here as Equation 1:

$$Pr(M|Sim_A=s_A, \ldots, Sim_Z=s_Z) = 1/Z(Pr(M) \cdot Pr(Sim_A=s_A|M) \ldots Pr(Sim_Z=s_Z|M))$$

where Z is a normalisation constant. For each attribute A, the rule learning module 1 determines a threshold T(A) such that the probability of two records being duplicates is significant given that the similarity of their A values is higher than T(A). For some attributes, there might be no such threshold satisfying this condition. The attributes with valid thresholds are recorded as "Distinctive Attributes".

The operation of the rule learning module 3 will now be described in terms of a practical example. In this example, the data sources 6 comprise three data sources $S_1$, $S_2$ and $S_3$ that each contain data about various leisure activities such as movie theatres, golf clubs, downhill skiing, and restaurants. Each record in these sources represents a single activity and it is associated with multiple common attributes such as title, address, rating, latitude, and longitude. Also, each entity type involves a number of unique attributes (e.g., attribute "vertical drop" for downhill skiing entities).

A sample of records in $S_1$ and $S_2$ is available to the rule learning module 3 and some of these records are labelled as duplicates. Entity types could be either given to the system, or automatically learnt. For example, in the latter case, the rule learning module 3 detects different entity types (e.g., movie theatres, golf clubs, downhill skiing, and restaurants) based on the characteristics of the records (e.g., the present non-null attributes, the ranges of attribute values, and the originating data sources). The rule learning module 3 detects the entity type of each record, and groups the records based on their entity types. The groups of records are either disjoint or overlapping.

For each group of records, the rule learning module 3 obtains a set of rules. An example rule might indicate that "any two records with a difference in latitude or longitude greater than 0.1 have a probability of being duplicates equal to 0.001". Another example rule is that "any two records with missing ZIP code have a probability of being duplicates equal to 0.2".

Once the rule learning module 3 has learnt the required de-duplication rules from the data sources 6, the system can operate in a de-duplication mode. In the de-duplication mode, the duplicate elimination module 5 uses the learnt rules to detect duplicate records in data sources $S_1 \ldots S_i$ and consolidates and stores the records in a central integrated duplicate-free database 11. At any point in time, the integrated database 11 contains duplicate-free records from the data sources $S_1, \ldots, S_i$.

The duplicate elimination module 5 accepts data coming from a new source $S_{i+1}$, performs blocking of records in $S_{i+1}$, detects the duplicate records within $S_{i+1}$, and duplicate records that span $S_{i+1}$ and any other sources from $S_1, \ldots, S_i$. Duplicates are then consolidated and added to the integrated database 11.

De-duplication is preferably performed in a holistic way based on all learnt rules. That is, the duplicate detection algorithm considers all relevant rules in order to obtain a single value indicating the probability that certain records are duplicates.

The rules that are used for de-duplicating certain records are preferably selected based on the entity types of such records. For instance, in the example described above, rules involving the attribute "vertical drop" are only used when the involved records represent "downhill skiing" sites.

The de-duplication process is mainly divided into sub-tasks: "similarity join" and "clustering". Similarity join provides a list of record pairs that have considerable probability of being duplicates. The clustering task uses the list of record pairs to group the records into a set of disjoint clusters such that each cluster of records represents the same real-world entity.

In one embodiment, for each new data source 6, the duplicate elimination module 5 obtains a set of candidate record pairs that are potentially duplicates. The records in each candidate record pair could belong entirely to the new data source, or to the new data source and an old data source. A candidate pair is a pair of records that has at least one distinctive attribute (call it A) with similarity above a predetermined threshold T(A). Pairs that do not satisfy this criterion are pruned (i.e., assumed non-duplicates). The duplicate elimination module 5 uses the learnt rules to compute the probability of each pair being duplicates. This procedure is described in the below in Algorithm 1.

```
Algorithm 1 Sim_Join(T(A),...,T(Z))

C ← φ
For each distinctive attribute A_i
    Insert into C all record pairs (t1,t2) such that Sim_{Ai} ≥ T(A_i)
End for
For each pair (t1,t2) ∈ C do
    Compute the values of Sim_A,...,Sim_Z
    Compute Pr(M = T|Sim= s_A,...,Sim_Z= s_Z) based on Equation 1
End for
Return pairs in C
```

The module 5 removes record pairs with low probability of being duplicates and uses the remaining pairs to cluster the records into groups such that each group (cluster) of records represents one real-world entity.

In order to efficiently find all record pairs such that $Sim_{Ai} \geq T(A_i)$ without checking every pair of records, the system performs the following. The system truncates parts of attributes of the records, and creates an inverted index on the remaining parts of the records. For example, assume that attribute 'Description' of a record t1 is "This is good restaurant". Because "This" and "is" are frequent words, they can be safely removed. The only two words in the inverted index pointing to t1 are "good" and "restaurant". Candidates are generated by going through the words mentioned in the inverted index and omitting all pairs of records that are linked to each word. For example, if word "good" points to records t1, t2 and t3, the system omits the candidates (t1,t2), (t2,t3), and (t1,t3).

For instance, assume that the similarity function Sim is cosine similarity, and each attribute value is represented as a collection of words, each of which is associated with a weight that reflect the number of times the word occurs multiplied by the inverse of its frequency across all values. The system truncates the insignificant words as follows. The system first sorts the words in each attribute based on their weights in ascending order. Let $w_1, \ldots, w_m$ be the weights of the sorted words. Then, the system truncates the first k words where $w_1^2 + \ldots + w_k^2 < T(A_i)$, where $T(A_i)$ is the similarity threshold over the attribute $A_i$.

In order to allow efficient updating to the record clustering when new data arrives, the module 5 avoids computationally intensive operations such as splitting and restructuring existing clusters. To achieve this goal, the module 5 stores multiple possible clusterings, each of which is associated with the probability of being correct. In probabilistic clustering, the outcome is multiple possible clusterings of records rather than a single clustering. The importance of keeping a number of possible clusterings is due to continuously adding new data sources. New data that arrives at a certain point of time can change the systems knowledge about the correct clustering of previously added records. Therefore, the system preferably retains clustering information that can potentially be useful at a later stage. The module 5 updates these clusterings incrementally using simple operations such as appending a new record to a clustering, or merging two existing clusters. At any point of time, the module 5 is able to provide the most probable clustering, which is close to the output of batch-clustering that has all data available from the beginning.

The following example describes an example of the operation of the duplicate elimination module 5. In this example, the following records are found in data sources $S_1$, $S_2$ and $S_3$:

$r_1$ (Entity Type: "Golf", Title: "The Ocean At Olympic Club", City: "San Francisco", State, "CA", architect: "Sam Whiting", holes: 18)

$r_2$ (Entity Type: "Golf", Title: "the Cliffs at Olympic Club", State: "California", holes: 9)

$r_3$ (Entity Type: "Golf and Tennis", Title: "Golfsmith Golf & Tennis", Phone: "(415) 974-6979", City: "San Francisco", State: "CA")

The above records are processed by first obtaining records with at least one similar attribute (e.g., $r_1$ and $r_2$ have similar title). Then, the relevant learnt rules (e.g., regarding Golf sites in our example) are used to determine the probability that each candidate pair of records being duplicate. Pairs with small probabilities of being duplicates are discarded, and the remaining pairs are used for clustering the records.

For example, assume that the similarity join process returned two candidate pairs $(r_1,r_2)$ and $(r_2,r_3)$ such that the probability that $r_1$ and $r_2$ are duplicates is 0.8 and the probability that $r_2$ and $r_3$ are duplicates is 0.1. The clustering algorithm discards the pairs $(r_2,r_3)$ and returns the clustering $\{r_1,r_2\}, \{r_3\}$, which indicates that $r_1$ and $r_2$ refer to the same real-world entity and $r_3$ refers to a different entity. Records $r_1$ and $r_2$ are then consolidated into one record $r_{12}$ which could be as follows:

$r_{12}$ (Entity Type: "Golf", Title: "The Ocean At Olympic Club", City: "San Francisco", State, "CA", architect: "Sam Whiting", holes: 18)

Another possible incremental clustering algorithm is now described. The algorithm constructs a similarity graph where each record is represented as a node, and each duplicate pair of records (according to the similarity join method) is represented as an edge. The algorithm initially assigns each record to a singleton cluster. The algorithm iteratively obtains and merges a random pair of clusters such that the number of edges between the two clusters is larger than the number of missing edges between the two clusters. The algorithm terminates when no more clusters can be merged.

Upon receiving a new data source, the system performs the blocking method for the records in the new source. Then, the system performs similarity join for the records in the new source, and between the records in the new source and the records in the previously inserted sources. The records in the new source are added as new nodes to the similarity graph and the resulting new duplicates are added as new edges. The clustering algorithm updates the existing clustering as follows. All nodes that are involved in newly inserted edges are removed from their current clusters and inserted into new singleton cluster. Then, the algorithm restarts the merging steps for these nodes only.

Embodiments of the disclosure use learnt de-duplication rules to de-duplicate data originating from a plurality of data sources. The system is operable to integrate data from a plurality of data sources into an integrated central database one source at a time. The system is also operable to learn the rules from sample data by using only samples of duplicate records.

Embodiments of the disclosure are particularly well suited to de-duplicating and integrating large volumes of data. Embodiments of the disclosure integrate the data more efficiently and accurately than conventional data de-duplication systems.

Figure 2:
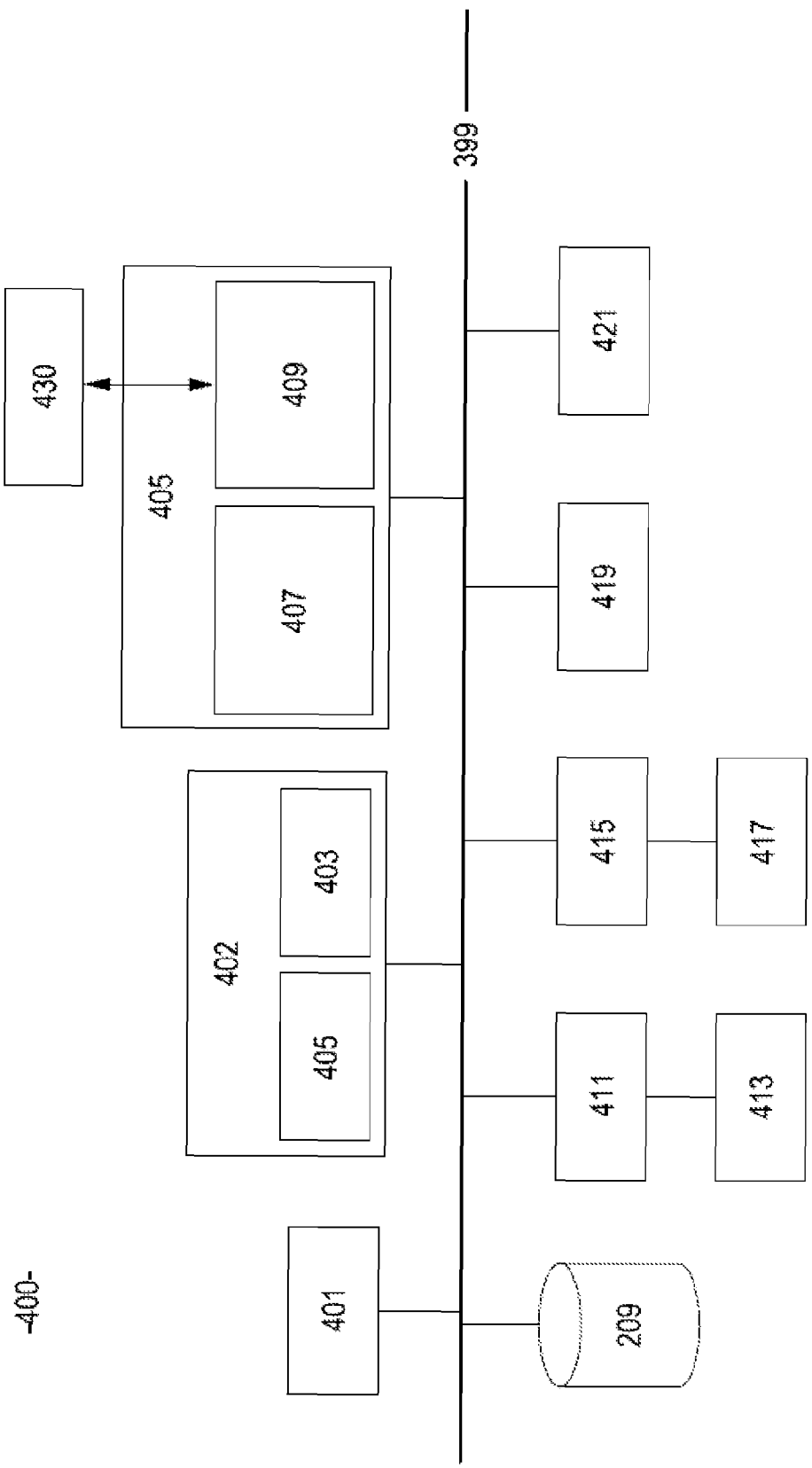
FIG. 2 is a schematic block diagram of an apparatus for implementing an embodiment of the disclosure.

FIG. 2 is a schematic block diagram of an apparatus according to an embodiment of the disclosure which is suitable for implementing any of the systems or processes described above. Apparatus 400 includes one or more processors, such as processor 401, providing an execution platform for executing machine readable instructions such as software. Commands and data from the processor 401 are communicated over a communication bus 399. The system 400 also includes a main memory 402, such as a Random Access Memory (RAM), where machine readable instructions may reside during runtime, and a secondary memory 405. The secondary memory 405 includes, for example, a hard disk drive 407 and/or a removable storage drive 430, representing a floppy diskette drive, a magnetic tape drive, a compact disk drive, etc., or a nonvolatile memory where a copy of the machine readable instructions or software may be stored. The secondary memory 405 may also include ROM (read only memory), EPROM (erasable, programmable ROM), EEPROM (electrically erasable, programmable ROM). In addition to software, data representing any one or more of updates, possible updates or candidate replacement entries, and listings for identified tuples may be stored in the main memory 402 and/or the secondary memory 405. The removable storage drive 430 reads from and/or writes to a removable storage unit 409 in a well-known manner.

A user interfaces with the system 400 with one or more input devices 411, such as a keyboard, a mouse, a stylus, and the like in order to provide user input data. The display adaptor 415 interfaces with the communication bus 399 and the display 417 and receives display data from the processor 401 and converts the display data into display commands for the display 417. A network interface 419 is provided for communicating with other systems and devices via a network (not shown). The system can include a wireless interface 421 for communicating with wireless devices in the wireless community.

It will be apparent to one of ordinary skill in the art that one or more of the components of the system 400 may not be included and/or other components may be added as is known in the art. The system 400 shown in FIG. 2 is provided as an example of a possible platform that may be used, and other types of platforms may be used as is known in the art. One or more of the steps described above may be implemented as instructions embedded on a computer readable medium and executed on the system 400. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

In one embodiment, equivalence classes 405 can reside in memory 402 having been derived from records of a database 209. One or more of algorithms of blocks 300, 305 or 307 can reside in memory 402 such as to provide respective engines 403 for cleaning, merging and selecting records of a database, including a modified instance of a database for example. That is, engine 403 can be a cleaning engine or a merge engine which is operable to perform the processes associated with the tasks of blocks 300, 305, 307 for example.

A database 209 is shown in FIG. 2 as a standalone database connected to bus 399. However, it can be a database which can be queried and have data written to it from a remote location using the wired or wireless network connections mentioned above. Alternatively, database 209 may be stored in memory 405, such as on a HDD of system 400 for example.

When used in this specification and claims, the terms "comprises" and "comprising" and variations thereof mean that the specified features, steps or integers are included. The terms are not to be interpreted to exclude the presence of other features, steps or components.

What is claimed is:

1. A method for integrating data into a database, the method comprising:
   storing data comprising a plurality of records which each comprise a plurality of attributes;
   analyzing a sample of records from the plurality of records by: identifying duplicate pairs of records in the sample records; and
   analyzing each attribute of each record of the duplicate pairs of records to identify a respective attribute condition which is indicative that the pairs of records are duplicates;
   comparing each attribute of a record with the respective attribute condition and, if the attribute satisfies the attribute condition, allocating the record to a disjoint group which comprises records with an attribute that satisfies the same respective attribute condition;
   identifying duplicate pairs of records in the records in each disjoint group;
   identifying duplicate pairs of records in records that are not allocated to a disjoint group;
   consolidating each duplicate pair of records into one consolidated record and storing the consolidated record in an integrated database; and
   identifying distinctive features of records;
   wherein identifying duplicate pairs of records comprises:
   analyzing the attributes of the records identifying candidate pairs of records, each candidate pair comprising a two records which have at least one similar attribute generating a similarity value which is indicative of the level of similarity between the two records in each candidate pair identifying each candidate pair with a similarity value above a predetermined level as a duplicate pair of records, wherein the similarity value is a conditional probability value which is indicative of the probability of the two records in a candidate pair being duplicates of one another;
   identifying a learning rule used to identify duplicate pairs of records;
   wherein the learning each rule comprises calculating a probability distribution by comparing the attributes of known duplicate records with a random sample of pairs of records, and wherein the calculation is based on a Bayes' rule.

2. A method according to claim 1, wherein records are allocated to each disjoint group in linear time.

3. A method according to claim 1, wherein the method further comprises truncating predetermined words which are insignificant for deduplication from attributes of records.

4. A method according to claim 1, wherein the method comprises allocating each record which comprises a distinctive feature to a respective disjoint group which comprises records with the same distinctive feature.

5. A method according to claim 1, wherein the method comprises only allocating a record to a disjoint group if, after a predetermined time, there are more than a predetermined number of records in the disjoint group.

6. A method according to claim 1, wherein, before the step of analysing the attributes of the records, the method further comprises learning at least one rule using sample data and then subsequently using each rule in the method to identify the candidate pairs of records and generate the similarity value.

7. A method according to claim 6, wherein the sample data comprises only duplicate records.

8. A method according to claim 6, wherein the method comprises grouping the records in the sample data into groups of records with records in each group having at least one attribute which is the same as at least one attribute in another record in the group.

9. A method according to claim 1, wherein the method further comprises calculating the conditional probability value from the probability distributions using the Naïve Bayes' rule.

10. A method according to claim 1, wherein the method further comprises comparing the similarity value of each candidate pair with the similarity value of each other candidate pair and clustering the records into a set of disjoint clusters.

11. A method according to claim 10, wherein the method comprises storing information representing each cluster for use with further data.

12. A method according to claim 1, wherein the method comprises using a plurality of rules to identify duplicate records.

13. A method according to claim 1, wherein the steps of the method are repeated for a plurality of data sources, one data source at a time.

14. A non-transitory computer-readable media embedded on a non-transitory tangible computer readable storage medium, the non-transitory computer-readable media including machine readable instructions that, when executed by a processor, implement a computer-implemented method for integrating data into a database, the method comprising:

storing data comprising a plurality of records which each comprise a plurality of attributes;

analyzing a sample of records from the plurality of records by:

identifying duplicate pairs of records in the sample records; and analyzing each attribute of each record of the duplicate pairs of records to identify a respective attribute condition which is indicative that the pairs of records are duplicates;

comparing each attribute of a record with the respective attribute condition and, if the attribute satisfies the attribute condition, allocating the record to a disjoint group which comprises records with an attribute that satisfies the same respective attribute condition;

identifying duplicate pairs of records in the records in each disjoint group;

identifying duplicate pairs of records in records that are not allocated to a disjoint group;

consolidating each duplicate pair of records into one consolidated record and storing the consolidated record in an integrated database; and identifying distinctive features of records; and wherein identifying duplicate pairs of records comprises: analyzing the attributes of the records;

identifying candidate pairs of records, each candidate pair comprising a two records which have at least one similar attribute;

generating a similarity value which is indicative of the level of similarity between the two records in each candidate pair;

identifying each candidate pair with a similarity value above a predetermined level as a duplicate pair of records, wherein the similarity value is a conditional probability value which is indicative of the probability of the two records in a candidate pair being duplicates of one another;

identifying a learning rule used to identify duplicate pairs of records;

wherein the learning each rule comprises calculating a probability distribution by comparing the attributes of known duplicate records with a random sample of pairs of records, and wherein the calculation is based on a Bayes' rule.

* * * * *